United States Patent
Moravek et al.

(10) Patent No.: US 9,970,123 B2
(45) Date of Patent: May 15, 2018

(54) ELECTROCONDUCTIVE COMPOSITE SUBSTRATES COATED WITH ELECTRODEPOSITABLE COATING COMPOSITIONS AND METHODS OF PREPARING THEM

(71) Applicant: PPG INDUSTRIES OHIO, INC., Cleveland, OH (US)

(72) Inventors: Scott Moravek, Cranberry Township, PA (US); Robin M Peffer, Valencia, PA (US); Michael A Mayo, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 661 days.

(21) Appl. No.: 13/940,943

(22) Filed: Jul. 12, 2013

(65) Prior Publication Data

US 2015/0017447 A1 Jan. 15, 2015

(51) Int. Cl.
| | |
|---|---|
| *C25D 13/06* | (2006.01) |
| *C25D 13/20* | (2006.01) |
| *C25D 13/12* | (2006.01) |
| *C09D 5/44* | (2006.01) |
| *C09D 5/24* | (2006.01) |
| *H01B 1/20* | (2006.01) |
| *C08J 7/04* | (2006.01) |
| *C09D 201/00* | (2006.01) |

(52) U.S. Cl.
CPC .............. *C25D 13/06* (2013.01); *C08J 7/042* (2013.01); *C09D 5/24* (2013.01); *C09D 5/44* (2013.01); *C09D 5/4473* (2013.01); *C09D 201/00* (2013.01); *C25D 13/12* (2013.01); *C25D 13/20* (2013.01); *H01B 1/20* (2013.01); *C08J 2363/00* (2013.01); *C08J 2400/00* (2013.01); *C08J 2423/28* (2013.01); *Y10T 428/31511* (2015.04)

(58) Field of Classification Search
None
See application file for complete search history.

(56) References Cited

U.S. PATENT DOCUMENTS

| | | |
|---|---|---|
| 3,408,278 A | 10/1968 | Stoodley |
| 4,664,768 A | 5/1987 | Scala et al. |
| 4,745,012 A | 5/1988 | Lo |
| 4,962,139 A | 10/1990 | Lo |
| 5,468,358 A | 11/1995 | Ohkawa et al. |
| 5,980,714 A | 11/1999 | Puyenbroek et al. |
| 7,867,468 B1 | 1/2011 | Haddon et al. |
| 2004/0238362 A1* | 12/2004 | December ............... B05D 1/36 204/492 |
| 2005/0113552 A1 | 5/2005 | Tazzia |
| 2005/0161337 A1 | 7/2005 | Byrd et al. |
| 2006/0013958 A1* | 1/2006 | Connelly ............... C08J 7/04 427/402 |
| 2008/0248210 A1* | 10/2008 | Kondos ................ B05D 5/00 427/412.1 |
| 2010/0178487 A1* | 7/2010 | Arai ....................... C08J 5/24 428/300.1 |

FOREIGN PATENT DOCUMENTS

WO        2005033373        4/2005

* cited by examiner

*Primary Examiner* — Sheeba Ahmed
(74) *Attorney, Agent, or Firm* — Krisanne Shideler

(57) ABSTRACT

The present invention is directed to a coated substrate comprising:

A) an electroconductive composite substrate comprising a resinous matrix reinforced with fibers, and
B) a cured coating layer electrophoretically deposited on at least at least a portion of a surface of the substrate, wherein the cured coating layer is deposited from a curable, electrodepositable coating composition comprising:
  (1) a resin component containing an active hydrogen-containing, cationic or anionic resin comprising an acrylic, polyester, polyurethane and/or polyepoxide polymer; and
  (2) a curing agent. The present invention is further directed to a process for coating a plastic, electroconductive substrate comprising electrophoretically depositing on the substrate the curable, electrodepositable coating composition described above, and heating the coated substrate to a temperature less than 250° F. for a time sufficient to cure the electrodeposited coating on the substrate.

7 Claims, No Drawings

ELECTROCONDUCTIVE COMPOSITE SUBSTRATES COATED WITH ELECTRODEPOSITABLE COATING COMPOSITIONS AND METHODS OF PREPARING THEM

FIELD OF THE INVENTION

The present invention relates to coated substrates comprising composite substrates having film-forming compositions electrophoretically deposited thereon.

BACKGROUND OF THE INVENTION

Automotive manufacturers are currently under pressure to increase the fuel economy of the vehicles they produce, and to decrease their carbon footprint in the manufacturing process. Challenges exist in doing both in an economical fashion while maintaining quality.

Automotive manufacturers are looking at lighter weight materials for vehicle body parts as well as streamlined processing, among other approaches.

Lighter weight materials typically include plastic and composites, but such substrates are often sensitive to the high temperatures usually needed to cure the protective and decorative coatings applied to the substrates. Many of the proposed plastics deform at temperatures as low as 250° F. Moreover, many of these substrates are not consistently electroconductive over their surfaces so that a coating may be evenly applied electrophoretically, resulting in uneven coverage.

It would be desirable to provide lightweight, electroconductive substrates electrophoretically coated with compositions that are curable at temperatures which the substrates can withstand without deformation or loss of other properties, and which demonstrate consistent coating coverage over the surface of the substrate.

SUMMARY OF THE INVENTION

The present invention is directed to a coated substrate comprising:

A) an electroconductive composite substrate comprising a resinous matrix reinforced with fibers, and B) a cured coating layer electrophoretically deposited on at least one surface of the substrate, wherein the cured coating layer is deposited from a curable, electrodepositable coating composition comprising:

(1) a resin component containing an active hydrogen-containing, cationic or anionic resin comprising an acrylic, polyester, polyurethane and/or polyepoxide polymer; and (2) a curing agent.

The present invention is further directed to a process for coating a plastic, electroconductive substrate comprising electrophoretically depositing on the substrate the curable, electrodepositable coating composition described above, and heating the coated substrate to a temperature less than 250° F. for a time sufficient to cure the electrodeposited coating on the substrate.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure), catalytic, electron beam, chemical free-radical initiation, and/or photo-initiation such as by exposure to ultraviolet light or other actinic radiation.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive groups occurs, the rate of reaction of the remaining unreacted reactive groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

By "essentially free" of a material is meant that a composition has only trace or incidental amounts of a given material, and that the material is not present in an amount sufficient to affect any properties of the composition.

The present invention provides coated substrates comprising electroconductive substrates and a coating layer electrophoretically deposited on at least a portion of the surface of the substrate. Examples of suitable substrates include electroconductive plastic or composite materials. Such substrates are often heat sensitive; a heat-sensitive substrate may be defined as any substrate that has a change in physical and/or chemical properties when exposed to a certain threshold temperature, usually for a specific period of time. For the purposes of the present invention, by "heat sensitive" is meant that the substrate demonstrates a heat distortion temperature around 120° C., often around 107° C.

Suitable substrates include elastomeric or plastic substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. Composite substrates comprising a resinous matrix such as one or more of polypropylene, polybutylene terephthalate, polystyrene, polyaniline, polypyrrole, polyepoxide, poly(methyl methacrylate), polyurethane, and polycarbonate, reinforced with fibers typically oriented as strands, multi-ply yarns, woven sheets, or braids. In particular embodiments the fibers are electroconductive and comprise at least one of stainless steel fibers, copper fibers, nickel fibers, silver fibers, aluminum fibers, metal plated glass fibers, and carbon fibers. The composite may be layered, but typically the fibers are encompassed by the resinous matrix.

In addition to a resinous matrix reinforced with fibers that may or may not be electroconductive, the electroconductive composite substrate may further comprise electroconductive particulate filler distributed throughout the resinous matrix. Examples of such electroconductive fillers include zinc, ferrophosphorus, tungsten, carbon, nickel, aluminum, copper, iron, steel, molybdenum disulphide, iron oxide, antimony doped titanium dioxide, nickel-doped titanium dioxide, graphite, silver, and aluminum particles. One or more of these fillers may be used.

The substrates are most often composite or plastic exterior automotive substrates; in particular, automotive body parts such as hoods, lids, fenders, door panels, roofs, bumpers, and the like.

Before depositing any treatment or coating compositions upon the surface of the substrate, it is common practice, though not necessary, to remove foreign matter from the surface by thoroughly cleaning and degreasing the surface. Such cleaning typically takes place after forming the substrate into an end-use shape. The surface of the substrate can be cleaned by physical or chemical means, such as mechanically abrading the surface or cleaning/degreasing with commercially available alkaline or acidic cleaning agents that are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to an elevated temperature (provided the temperature is not so high as to induce deformation) or by passing the substrate between squeegee rolls.

The substrate to which the coating composition is applied may be a bare, cleaned surface; it may be pretreated with one or more pretreatment compositions, and/or prepainted with one or more coating compositions, primers, etc., applied by any suitable method.

In certain embodiments, the electroconductive composite substrate comprises an electroconductive coating layer deposited on the surface of the substrate. Such coating layers typically contain electroconductive pigments. Examples of compositions that may be used as electroconductive coating layers include adhesion promoting compositions, such as a composition comprising:

(a) a halogenated polyolefin;
(b) a film-forming polymer different from the polyolefin (a); and
(c) an electroconductive pigment.

Suitable adhesion promoters include, for example, chlorinated polyolefin adhesion promoters such as are described in U.S. Pat. Nos. 4,997,882; 5,319,032; and 5,397,602, incorporated by reference herein in their entireties. Other useful adhesion promoting coatings are disclosed in U.S. Pat. No. 6,001,469 (a coating composition containing a saturated polyhydroxylated polydiene polymer having terminal hydroxyl groups), U.S. Pat. No. 5,863,646 (a coating composition having a blend of a saturated polyhydroxylated polydiene polymer and a chlorinated polyolefin) and U.S. Pat. No. 5,135,984 (a coating composition having an adhesion promoting material obtained by reacting a chlorinated polyolefin, maleic acid anhydride, acryl or methacryl modified hydrogenated polybutadiene containing at least one acryloyl group or methacryloyl group per unit molecule, and organic peroxide), which are incorporated herein by reference in their entireties.

Suitable electroconductive pigments include electrically conductive carbon black pigments. Generally the carbon blacks can be any one or a blend of carbon blacks ranging from those that are known as higher conductive carbon blacks, i.e. those with a BET surface area greater than 500 $m^2$/gram and DBP adsorption number (determined in accordance with ASTM D2414-93) of 200 to 600 ml/100 g. to those with lower DBP numbers on the order of 30 to 120 ml/100 gram such as those with DBP numbers of 40 to 80 ml/100 grams.

Examples of commercially available electroconductive carbon blacks include Cabot Monarch™ 1300, Cabot XC-72R, Black Pearls 2000 and Vulcan XC 72 sold by Cabot Corporation; Acheson Electrodag™ 230 sold by Acheson Colloids Co.; Columbian Raven™ 3500 sold by Columbian Carbon Co.; and Printex™ XE 2, Printex 200, Printex L and Printex L6 sold by DeGussa Corporation, Pigments Group. Suitable carbon blacks also include high structure carbon black particles such as acetylene black and oil furnace black, Particular examples include carbon black particles having a particle size ($d_{50}$) of 100 nm or smaller, a nitrogen specific surface area of 10-5,000 $m^2$/g, a rate of DBP oil absorption of 50 cm$^3$/100 g or larger, and producing 2% or less desorption gas with heating at 950° C.

Also, electrically conductive silica pigments may be used. Examples include AEROSIL 200 sold by Japan Aerosil Co., Ltd., and SYLOID® 161, SYLOID® 244, SYLOID® 308, SYLOID® 404 and SYLOID® 978 all available from Fuji Davison Co., Ltd.

Other electrically conductive pigments can be used, for example, metal powders such as aluminum, copper or special steel, molybdenum disulphide, iron oxide, e.g., black iron oxide, antimony-doped titanium dioxide and nickel doped titanium dioxide.

Also useful are particles coated with metals such as cobalt, copper, nickel, iron, tin, zinc, and combinations of thereof. Suitable particles which can be coated with the aforementioned metals include alumina, aluminum, aromatic polyester, boron nitride, chromium, graphite, iron, molydenum, neadymim/iron/boron, samarium cobalt, silicon carbide, stainless steel, titanium diboride, tungsten, tungsten carbide, and zirconia particles. Such metal-coated particles are commercially available from Advanced Ceramics Corp.

Other metal-coated particles which may be used as electroconductive pigments include ceramic microballoons, chopped glass fibers, graphite powder and flake, boron nitride, mica flake, copper powder and flake, nickel powder and flake, aluminum coated with metals such as carbon, copper, nickel, palladium, silicon, silver and titanium coatings. These particles are typically metal-coated using fluidized bed chemical vacuum deposition techniques. Such metal-coated particles are commercially available from Powdermet, Inc. Mixtures of different electroconductive pigments can be used.

In one embodiment of the present invention, the electroconductive pigment can be selected from at least one of ferrophosphorous, zinc, tungsten and mixtures thereof. The conductive pigment typically is dispersed in the polymeric component(s) such that the weight ratio of conductive pigment to polymer in the adhesion promoting composition is within the range of 1.0 to 6.0:1. In another embodiment of the present invention, zinc and ferrophosphorous each are used alone or in combination. In one particular embodiment, either zinc or ferrophosphorous is used as the sole conductive pigment. In an alternative embodiment of the present invention, mixtures of zinc and tungsten are employed. When used, the tungsten is dispersed in the polymeric component(s) such that the weight ratio of conductive pigment to polymer in the adhesion promoting composition is within the range of 0.1 to 4.0:1, typically, within the range of 0.75 to 1.25:1. Higher levels of tungsten can be used if desired. Although it is expected that higher ranges of tungsten will also be effective for purposes of the present invention, the price of tungsten can make the use of high levels of tungsten can be cost-prohibitive for most applications.

Suitable zinc pigments are commercially available from ZINCOLI GmbH as trademark ZINCOLIS® 620 or 520. Suitable iron phosphide pigments, also referred to as ferrophosphorus, are commercially available from Occidental Chemical Corporation under the tradename FERROPHOS™.

Other examples of compositions that may be used as electroconductive coating layers on the composite substrate include electroconductive (e.g., weldable) primer compositions, such as a composition comprising:

(A) a resinous binder; and
(B) at least one of the electroconductive pigments noted above, dispersed in the resinous binder; wherein the resinous binder (A) comprises (1) at least one polymer containing reactive functional groups, and (2) at least one curing agent having functional groups reactive with the functional groups on the polymer (1).

The resinous binder of the electroconductive primer composition comprises a functional group-containing polymer, wherein the functional group is reactive with the same or other functional groups in the resinous binder to form a crosslinked thermoset coating during curing. Examples of such functional groups include but are not limited to hydroxyl, amine, carbamate, carboxyl, epoxy, and urea groups. Typically, the functional group-containing polymer comprises epoxy containing polymers and phosphatized epoxy containing polymers.

Useful epoxy group-containing polymers have at least one epoxy or oxirane group in the molecule, such as polyglycidyl ethers of polyhydric alcohols. Useful polyglycidyl ethers of polyhydric alcohols can be formed by reacting epihalohydrins like epibromohydrin, dichlorohydrin and epichlorohydrin with polyhydric alcohols, such as dihydric alcohols, in the presence of an alkali condensation and dehydrohalogenation catalyst. Suitable alkali condensation and dehydrohalogenation catalyst include sodium hydroxide or potassium hydroxide.

Suitable polyhydric alcohols can be aromatic, aliphatic or cycloaliphatic. Non-limiting examples of suitable aromatic polyhydric alcohols include phenols that are preferably at least dihydric phenols. Other useful aromatic polyhydric alcohols include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; Bisphenol F; long-chain bisphenols; and 2,2-bis(4-hydroxyphenyl)propane, i.e., Bisphenol A.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

In certain embodiments of the present invention, the epoxy group-containing polymer in the electroconductive primer has at least two epoxy groups per molecule and aromatic or cycloaliphatic functionality which can improve adhesion to a metal substrate. Further, the epoxy group-containing polymer can have a number average molecular weight ("Mn") ranging from 220 to 25,000, as determined by gel permeation chromatography.

Useful epoxy group-containing polymers can include those disclosed in U.S. Pat. Nos. 5,294,265; 5,306,526 and 5,653,823, which are hereby incorporated by reference. Other useful epoxy group-containing materials can include epoxy-functional acrylic polymers, glycidyl esters of carboxylic acids and mixtures thereof. Examples of suitable commercially available epoxy group-containing polymers can include those which are available from Momentive Specialty Chemicals Inc. under the tradename EPON® (e.g., EPON® 836, EPON® 828, EPON® 1002F and EPON® 1004F).

Phosphatized group-containing polymers typically comprise a reaction product of an epoxy group-containing polymer with a compound containing phosphorus acid groups. Usually, the resulting reaction product comprises reactive functional groups.

The compound containing phosphorus add groups that is reacted with the epoxy group-containing polymer can comprise phosphonic acids, phosphorous acid, phosphoric acids (which are typically employed) including super- and poly-, and mixtures thereof.

Examples of suitable phosphonic acids include those having at least one group of the structure:

where R is —C—, usually $CH_2$, and typically $O-CO-(CH_2)_2-$. Nonlimiting examples of suitable phosphonic acids include 1-hydroxyethylidene-1,1-diphosphonic acid, methylene phosphonic acids, and alpha-aminomethylene phosphonic acids containing at least one group of the structure:

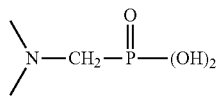

such as (2-hydroxyethyl)aminobis(methylene phosphonic) acid, isopropylaminobis(methylenephosphonic) acid and other aminomethylene phosphonic acids disclosed in U.S. Pat. No. 5,034,556 at column 2, line 52 to column 3, line 43, which is hereby incorporated by reference.

Other useful phosphonic acids include alpha-carboxymethylene phosphonic acids containing at least one group of the structure:

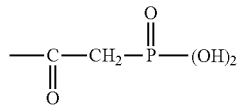

Nonlimiting examples of suitable phosphonic acids can include benzylaminobis(methylene phosphonic) acid, cocoaminobis(methylene phosphonic) acid, triethylsilylpropylamino(methylene phosphonic) acid and carboxyethyl phosphonic acid.

The equivalent ratio of the compound containing phosphorus acid groups to epoxy group-containing polymer can be within the range of 0.3 to 5.01, usually 0.5 to 3.5:1. The epoxy group-containing polymer and the compound-containing phosphorus acid groups can be reacted together by any method known to those skilled in the art.

The functional groups associated with the reaction product of the epoxy group-containing polymer and the compound-containing phosphorus acid groups are hydroxyl groups including acidic hydroxyls or hydroxyl groups and epoxy groups depending on the equivalent ratio of the compound containing phosphorus acid groups to epoxy group-containing polymer.

The resinous binder of the electroconductive primer also can comprise a curing agent having functional groups that are reactive with the functional groups of the reaction product described above. The curing agent can be selected from at least one of aminoplasts, polyisocyanates, including blocked isocyanates, polyacids, organometallic acid-functional materials, polyamines, polyamides and mixtures of any of the foregoing depending on the identity of the functional groups in the reaction product.

Useful aminoplasts can be obtained from the condensation reaction of formaldehyde with an amine or amide, Nonlimiting examples of suitable amines or amides include melamine, urea and benzoguanamine.

Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries. Inc. under the tradename CYMEL® and from Solutia, Inc. under the trademark RESIMENE®. Specific examples of suitable aminoplasts include CYMEL® 385 (for water-based compositions), CYMEL® 1158 imino-functional melamine formaldehyde condensates, and CYMEL® 303.

Other curing agents suitable for use in the electroconductive primer compositions include polyisocyanate curing agents. As used herein, the term "polyisocyanate" is intended to include blocked (or capped) polyisocyanates as well as unblocked polyisocyanates. The polyisocyanate can be aliphatic, aromatic, or a mixture of the foregoing. Although higher polyisocyanates such as isocyanurates of diisocyanates are often used, diisocyanates can be used. Higher polyisocyanates also can be used in combination with diisocyanates. Isocyanate prepolymers, for example reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. Other useful curing agents comprise blocked polyisocyanate compounds such as, for example the tricarbamoyl triazine compounds described in detail in U.S. Pat. No. 5,084,541, which is incorporated herein by reference.

Suitable curing agents are described in U.S. Pat. No. 4,346,143 at column 5, lines 45-62 and include blocked or unblocked di- or polyisocyanates such as toluene diisocyanate blocked with caprolactam. A toluene diisocyanate blocked with caprolactam is commercially available from Bayer Corporation as DESMODUR® BL 1265.

Suitable polyacid curing agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Useful organometallic complexed materials which can be used as curing agents include a stabilized ammonium zirconium carbonate solution commercially available from Magnesium Elektron, Inc. as BACOTE™ 20, stabilized ammonium, zirconium carbonate, and a zinc-based polymer crosslinking agent commercially available from Ultra Additives Inc. as ZINPLEX 15.

Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted—aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. These and other suitable polyamines are described in detail in U.S. Pat. No. 4,046,729 at column 6, line 61 to column 7, line 26, which is incorporated herein by reference.

Appropriate mixtures of curing agents may also be used in the electroconductive primer. The weight percent of the curing agent generally ranges from 5 to 60 percent based on the total weight of the resinous binder.

The coating layer B) on the coated substrate of the present invention may be electrophoretically deposited on one or more surfaces of the electroconductive substrate. In certain embodiments of the present invention, the coating layer is deposited from a curable, electrodepositable coating composition comprising:

(1) a resin component containing an active hydrogen-containing, cationic or anionic resin comprising an acrylic, polyester, polyurethane and/or polyepoxide polymer; and (2) a curing agent.

In anionic electrodepositable coating compositions, suitable anionic resin components (1) include, for example, phosphatized epoxy resins that are electrodepositable on an anode, in combination with aminoplast curing agents (2) such as one or more of those disclosed below. Other examples of film-forming resins (1) suitable for use in anionic electrodeposition bath compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another suitable electrodepositable resin comprises an alkyd-aminoplast vehicle. i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, all of which are herein incorporated by reference.

Exemplary phosphated epoxy resins are ungelled and typically are prepared as follows. An epoxy-containing material, such as a polyepoxide is reacted with a phosphorus acid such as a phosphoric acid or an equivalent thereof. The polyepoxide can be a compound or a mixture of compounds having more than 1.0 epoxy groups per molecule. Several polyepoxides are known in the art. Examples of the polyepoxides can be found in the Handbook of Epoxy Resins, Lee and Neville, 1967, McGraw-Hill Book Company.

A useful class of polyepoxides are the polyglycidyl ethers of polyphenols, such as Bisphenol A. These are produced by etherification of a polyphenol with an epichlorohydrin in the presence of an alkali. The phenolic compound can be 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl) propane; bis(2-hydroxynaphthyl) methane; 1,5-dihydroxynaphthalene; and 1,1-bis(4-hydroxy-3-allylphenyl)ethane. Another useful class of polyepoxides are produced similarly from polyphenol resins.

In addition to the polyepoxides described above, there can also be employed addition polymerization polymers containing pendant epoxy groups. These polymers are made by copolymerizing a variety of polymerizable ethylenically unsaturated monomers at least one of which is an epoxy containing monomer, e.g., glycidyl acrylate or glycidyl methacrylate.

A suitable ethylenically unsaturated monomer that does not contain a group that is reactive with the epoxy group can be employed herein as a comonomer. The preferred monomers include alpha, beta-ethylenically unsaturated monomers, e.g., unsaturated carboxylic acid esters of saturated alcohols containing from 1 to about 8 carbon atoms, and monovinyl aromatic monomers such as styrene and vinyl toluene.

The preferred polyepoxides have epoxy equivalent weight of about 172 to 5000 and preferably 300 to 1000.

In addition to the polyepoxides, the reaction mixture can contain a monomeric monoepoxide such as monoglycidyl ethers of alcohols and phenols, such as phenyl glycidyl ether, and glycidyl esters of monocarboxylic acids such as glycidyl neodecanoate.

The phosphoric acid that is reacted with the epoxy-containing material can be a 100 percent orthophosphoric acid or a phosphoric acid aqueous solution such as is referred to as an 85 percent phosphoric acid. Other forms of phosphoric acid such as superphosphoric acid, diphosphoric acid and triphosphoric acid can be employed herein. Also, the polymeric or partial anhydrides of phosphoric acids can be employed. Typically, aqueous phosphoric acids that are of about 70 to 90 percent and preferably about 85 percent phosphoric acid are employed.

In addition to the phosphoric acid, phosphonic acids or phosphinic acids may also be reacted with the epoxy-containing material. Examples of phosphonic acids are organophosphonic acids of the structure:

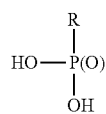

wherein R is organic radical such as those having a total of 1-30, such as 6-18 carbons, R can be aliphatic, aromatic or mixed aliphatic/aromatic and can be an unsubstituted hydrocarbon or a substituted hydrocarbon.

Examples of phosphinic acids are organophosphinic acids of the structure:

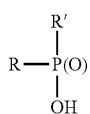

wherein R and R' are each independently hydrogen or organic radicals. Examples of such radicals are those having a total of 1-30, such as 6-18 carbons. The organic component of the phosphinic acid (R, R') can be aliphatic, aromatic or mixed aliphatic/aromatic. R and R' can be an unsubstituted hydrocarbon or a substituted hydrocarbon.

Representative of the organophosphonic acids are as follows: 3-amino propyl phosphonic acid, 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphinic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1,12-phosphonic acid, poly(ethylene glycol) phosphonic acid.

The reaction of the polyepoxide with the phosphorus acids is typically conducted in organic solvent by mixing the polyepoxide with a mixture of phosphorus acid and the organophosphonic acid and/or the organophosphinic acid and heating optionally in the presence of catalyst such as an onium salt at elevated temperature for 30 to 90 minutes to complete the reaction. The relative amounts of the polyepoxide and the phosphorus acids that are reacted with one another are as follows: for each equivalent of epoxy, there are 0.1 to 0.8 moles of phosphoric acid and from 0.01 to 0.4 moles of organophosphonic and/or organophosphinic acid with the molar ratio of phosphoric to organophosphonic and/or organophosphinic acid being within the range of 1:0.01 to 0.5. The epoxy-phosphorus acid reaction products typically have an acid value of 10 to 60, preferably 15 to 50 based on resin solids.

Besides reacting the epoxy-containing material with a mixture of phosphoric acid and the organophosphonic and/or organophosphinic acid, the polyepoxide can be reacted separately with the phosphoric acid and with either or both of the organophosphonic acid and the organophosphinic acid. The various reaction products can then be combined.

Particularly useful aminoplast resins as the curing agent (2) are condensation products of an aldehyde, e.g., formaldehyde, acetaldehyde, crotonaldehyde, and benzaldehyde and an amino or amido group containing material such as urea, melamine, and benzoguanamine. Products obtained from the reaction of alcohols and formaldehyde with melamine, urea and benzoguanamine are particularly useful. In the presence of phosphated epoxy resins, the aminoplasts cure at low temperatures.

A typical cationic electrodepositable composition comprises a resin component (1) containing an active hydrogen-containing, cationic salt group-containing resin that is electrodepositable on a cathode. Suitable acrylic polymers that may be used as the active hydrogen-containing, cationic salt group-containing resin include copolymers of one or more alkyl esters of acrylic acid or methacrylic acid optionally together with one or more other polymerizable ethylenically unsaturated monomers. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include nitriles such acrylonitrile and methacrylonitrile, vinyl and vinylidene halides such as vinyl chloride and vinylidene fluoride and vinyl esters such as vinyl acetate. Acid and anhydride functional ethylenically unsaturated monomers such as acrylic acid, methacrylic acid or anhydride, itaconic acid, maleic acid or anhydride, or fumaric acid may be used. Amide functional monomers including, acrylamide, methacrylamide, and N-alkyl substituted (meth)acrylamides are also suitable. Vinyl aromatic compounds such as styrene and vinyl toluene are also suitable.

Functional groups such as hydroxyl and amino groups may be incorporated into the acrylic polymer by using functional monomers such as hydroxyalkyl acrylates and methacrylates or aminoalkyl acrylates and methacrylates. Tertiary amino groups (for conversion to cationic salt groups) may be incorporated into the acrylic polymer by using dialkylaminoalkyl(meth)acrylate functional monomers such as dimethylaminoethyl methacrylate, diethylaminoethyl methacrylate, dipropylaminoethyl methacrylate, and the like.

Epoxide functional groups (for conversion to cationic salt groups) may be incorporated into the acrylic polymer by using functional monomers such as glycidyl acrylate and methacrylate, 3,4-epoxycyclohexylmethyl(meth)acrylate, epoxycyclohexyl)ethyl(meth)acrylate, or allyl glycidyl ether. Alternatively, epoxide functional groups may be incorporated into the acrylic polymer by reacting hydroxyl groups on the acrylic polymer with an epihalohydrin or dihalohydrin such as epichlorohydrin or dichlorohydrin in the presence of alkali.

The acrylic polymer may be prepared by traditional free radical initiated polymerization techniques, such as solution or emulsion polymerization, as known in the art using suitable catalysts which include organic peroxides and azo type compounds and optionally chain transfer agents such as alpha-methyl styrene dimer and tertiary dodecyl mercaptan.

Besides acrylic polymers, the active hydrogen-containing, cationic salt group-containing resin may be a polyester. The polyesters may be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol.

Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

The polyesters contain a portion of free hydroxyl groups (done by using excess polyhydric alcohol and/or higher polyols during preparation of the polyester) which are available for crosslinking reactions.

Epoxide functional groups may be incorporated into the polyester by reacting hydroxyl groups on the polyester with an epihalohydrin or dihalohydrin such as epichlorohydrin or dichlorohydrin in the presence of alkali.

Alkanolamines and dialkanolamines may be used in combination with the polyols in the preparation of the polyester, and the amine groups later alkylated to form tertiary amino groups for conversion to cationic salt groups. Likewise, tertiary amines such as N,N-dialkylalkanolamines and N-alkyldialkanolamines may be used in the preparation of the polyester. Examples of suitable tertiary amines include those N-alkyl dialkanolamines disclosed in U.S. Pat. No. 5,483,012, at column 3, lines 49-63. Suitable polyesters for use in the process of the present invention include those disclosed in U.S. Pat. No. 3,928,157.

Polyurethanes can also be used as the active hydrogen-containing, cationic salt group-containing resin. Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed above for use in the preparation of the polyester may also be used in place of or in combination with the polymeric polyols.

The organic polyisocyanate used to prepare the polyurethane polymer is often an aliphatic polyisocyanate. Diisocyanates and/or higher polyisocyanates are suitable.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aralkyl diisocyanates are meta-xylylene diisocyanate and $\alpha,\alpha,\alpha',\alpha'$-tetramethylmeta-xylylene diisocyanate.

Isocyanate prepolymers, for example, reaction products of polyisocyanates with polyols such as neopentyl glycol and trimethylol propane or with polymeric polyols such as polycaprolactone dials and triols (NCO/OH equivalent ratio greater than one) can also be used in the preparation of the polyurethane.

Hydroxyl functional tertiary amines such as N,N-dialkylalkanolamines and N-alkyl dialkanolamines may be used in combination with the other polyols in the preparation of the polyurethane. Examples of suitable tertiary amines include those N-alkyl dialkanolamines disclosed in U.S. Pat. No. 5,483,012, at column 3, lines 49-63.

Epoxide functional groups may be incorporated into the polyurethane by reacting hydroxyl groups on the polyurethane with an epihalohydrin or dihalohydrin such as epichlorohydrin or dichlorohydrin in the presence of alkali.

Suitable polyepoxides polymers for use as the active hydrogen-containing, cationic salt group-containing resin include, for example, a polyepoxide chain-extended by reacting together a polyepoxide and a polyhydroxyl group-containing material such as alcoholic hydroxyl group-containing materials and phenolic hydroxyl group-containing materials to chain extend or build the molecular weight of the polyepoxide.

A chain-extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i.e., epoxy:polyhydroxyl group-containing material is typically from about 1.00:0.75 to 1.00:2.00.

In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl) propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as those disclosed above.

The polyepoxides may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins.

The resins used in the cationic electrodepositable composition typically have number average molecular weights ranging from about 180 to 500, often from about 186 to 350.

The cationic resin used in the electrodepositable composition contains cationic salt groups. The cationic salt groups may be incorporated into the resin by any means known in the art depending on the type of resin and/or active hydrogen group, such as by acidifying tertiary amine groups in the resin as described below or by reacting epoxide groups in the resin with a cationic salt group former. By "cationic salt group former" is meant a material which is reactive with epoxy groups and which can be acidified before, during, or after reaction with epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides that can be mixed with acid prior to reaction with the epoxy groups and form ternary sulfonium salt groups upon subsequent reaction with the epoxy groups.

When amines are used as the cationic salt formers, monoamines are often used, and hydroxyl-containing amines are particularly suitable. Polyamines may be used but are not recommended because of a tendency to gel the resin.

In a typical embodiment of the invention, the cationic salt group-containing resin contains amine salt groups, which are derived from an amine containing a nitrogen atom to which is bonded at least one, usually two, alkyl groups having a hetero atom in a beta-position relative to the nitrogen atom. A hetero atom is a non-carbon or non-hydrogen atom, typically oxygen, nitrogen, or sulfur.

Hydroxyl-containing amines, when used as the cationic salt group formers, may impart the resin with amine groups comprising a nitrogen atom to which is bonded at least one alkyl group having a hetero atom in a beta-position relative to the nitrogen atom. Examples of hydroxyl-containing amines are alkanolamines, dialkanolamines, alkyl alkanolamines, and aralkyl alkanolamines containing from 1 to 18 carbon atoms, usually 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Minor amounts of amines such as mono, di, and trialkylamines and mixed aryl-alkyl amines which do not contain hydroxyl groups, or amines substituted with groups other than hydroxyl which do not negatively affect the reaction between the amine and the epoxy may also be used, but their use is not preferred. Specific examples include ethylamine, methylethylamine, triethylamine, N-benzyldimethylamine, dicocoamine and N,N-dimethylcyclohexylamine.

The reaction of a primary and/or secondary amine with epoxide groups on the polymer takes place upon mixing of the amine and polymer. The amine may be added to the polymer or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50 to 150° C. may be done to hasten the reaction.

The tertiary amine functional polymer (or the reaction product of the primary and/or secondary amine and the epoxide functional polymer) is rendered cationic and water dispersible by at least partial neutralization with an acid. Suitable acids include organic and inorganic acids such as formic acid, acetic acid, lactic acid, phosphoric acid, dimethylolpropionic acid, and sulfamic acid. Lactic acid is used most often. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with an epoxide functional polymer, the tertiary amine can be pre-reacted with the neutralizing acid to form the amine salt and then the amine salt reacted with the polymer to form a quaternary salt group-containing resin. The reaction is conducted by mixing the amine salt with the polymer in water. Typically the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally at or slightly above room temperature, to a maximum temperature of about 100° C. (at atmospheric pressure). At higher pressures, higher reaction temperatures may be used. Usually the reaction temperature is in the range of about 60 to 100° C. Solvents such as a sterically hindered ester, ether, or sterically hindered ketone may be used, but their use is not necessary.

In addition to the primary, secondary, and tertiary amines disclosed above, a portion of the amine that is reacted with the polymer can be a ketimine of a polyamine, such as is described in U.S. Pat. No. 4,104,147, column 6, line 23 to column 7, line 23. The ketimine groups decompose upon dispersing the amine-epoxy reaction product in water.

In addition to resins containing amine salts and quaternary ammonium salt groups, cationic resins containing ternary sulfonium groups may be used in forming the cationic salt group-containing resin. Examples of these resins and their method of preparation are described in U.S. Pat. No. 3,793,278 to DeBona and U.S. Pat. No. 3,959,106 to Bosso et al., incorporated herein by reference.

The extent of ionic salt group formation should be such that when the resin is mixed with an aqueous medium and the other ingredients, a stable dispersion of the electrodepositable composition will form. By "stable dispersion" is meant one that does not settle or is easily redispersible if some settling occurs. Moreover, the dispersion should be of sufficient ionic character that the dispersed particles will migrate toward and electrodeposit on a cathode or anode, as appropriate, when an electrical potential is set up between an anode and a cathode immersed in the aqueous dispersion.

Generally, the cationic resin is non-gelled and contains from about 0.1 to 3.0, often from about 0.1 to 0.7 milliequivalents of cationic salt group per gram of resin solids. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

The active hydrogens associated with the cationic resin include any active hydrogens which are reactive with isocyanates within the temperature range of about 93 to 204° C., usually about 121 to 177° C. Typically, the active hydrogens comprise hydroxyl and primary and secondary amino, including mixed groups such as hydroxyl and primary amino. Typically, the resin will have an active hydrogen content of about 1.7 to 10 millequivalents, more often about 2.0 to 5 millequivalents of active hydrogen per gram of resin solids.

The cationic salt group-containing resin is typically present in the electrodepositable composition in an amount of 50 to 90 percent, often 55 to 75 percent by weight, based on the total weight of the cationic salt group-containing resin and the curing agent.

The polyisocyanate curing agent (2) used in a cationic electrodepositable composition is at least partially capped. Often the polyisocyanate curing agent is a fully capped polyisocyanate with substantially no free isocyanate groups. The polyisocyanate can be an aliphatic or an aromatic polyisocyanate or a mixture of the two. Diisocyanates are used most often, although higher polyisocyanates can be used in place of or in combination with diisocyanates.

Examples of polyisocyanates suitable for use as curing agents include all those disclosed above as suitable for use in the preparation of the polyurethane. In a particular embodiment, the polyisocyanate is isophorone diisocyanate capped with trimethylol propane and/or methyl ethyl ketoxime.

Any suitable aliphatic, cycloaliphatic, or aromatic alkyl monoalcohol or phenolic compound may be used as a capping agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, and amines such as dibutyl amine.

The polyisocyanate curing agent (2) is typically present in the cationic electrodepositable composition in an amount of 10 to 50 percent, often 25 to 45 percent by weight, based on the total weight of the cationic salt group-containing resin and the curing agent.

The curable, electrodepositable coating composition may additionally include optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used they are present in the electrodepositable composition in an amount of 0.1 to 2 percent by weight, based on the total weight of resin solids in the electrodepositable composition. Other optional additives such as surfactants, wetting agents or catalysts can be included in the composition.

Catalysts suitable for use in a cationic electrodepositable composition include those effective for reactions of isocyanates with active hydrogens, such as any of those mentioned above.

The electrodepositable coating composition may be applied as a transparent clear coat, in which case it is free of any pigments. Alternatively, the coating composition may contain colorants conventionally used in surface coatings, rendering them translucent or opaque. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions, rendering the coating composition translucent or opaque. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating composition include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the electrodepositable coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The electrodepositable compositions are typically prepared as electrodeposition baths, diluted with water. The composition used as an electrodeposition bath in the process of the present invention has a resin solids content usually within the range of about 5 to 30 percent by weight, often 10 to 30 percent by weight or 5 to 25 percent by weight based on total weight of the electrodeposition bath.

Besides water, the aqueous medium of the electrodeposition bath may contain a coalescing solvent. Useful coalescing solvents include hydrocarbons, alcohols, esters, ethers and ketones. The most commonly used coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, often from about 0.05 to about 5 percent by weight based on total weight of the aqueous medium.

The curable, electrodepositable coating composition may be prepared using the following process:
(1) combining (i) the ionic resin component as described above with (ii) a curing agent to form a reactive mixture;
(2) adding a catalyst composition as needed to the reactive mixture; and
(3) diluting the reactive mixture with water to a solids content of 10 to 30 percent by weight, based on the total weight of the reactive mixture.

In certain embodiments of the present invention, after diluting the reactive mixture with water to a solids content of up to 30 percent by weight, a portion (usually twenty percent by weight) of the reactive mixture may be removed by ultrafiltration and replaced with deionized water.

Before any treatment or electrodeposition, the substrate may optionally be formed into an object of manufacture.

In the process of electrodeposition, the electroconductive substrate being coated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the electroconductive substrate.

Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film.

After electrodeposition, the coated substrate is heated to cure the deposited compositions. The heating or curing operation is usually carried out at a temperature less than 250° F. (121.1° C.), often less than 225° F. (107.2° C.), for a period of time sufficient to effect cure of the composition, typically ranging from 10 to 60 minutes. The thickness of the resultant film is usually from about 10 to 50 microns.

In certain embodiments of the present invention, particularly when the substrate is an automotive body part, the coated substrate may further comprise a primer coating layer applied on the surface of the substrate subsequent to application and curing of the electrodepositable coating composition, followed by one or more topcoats. The primer coating layer and topcoat layers may comprise any coating composition known in the art; in an automotive application, the coatings are typically curable compositions. The coatings can comprise a resinous binder and a pigment and/or other colorant, as well as optional additives well known in the art of coating compositions. Nonlimiting examples of resinous binders are acrylic polymers, polyesters, alkyds, and polyurethanes.

The following examples are intended to illustrate various embodiments of the invention, and should not be construed as limiting the invention in any way.

EXAMPLE

This example illustrates the preparation and application of an electrophoretically depositable coating to composite substrates.

The substrate was a carbon fiber composite made from a woven carbon fiber mat and epoxy resin. The flat composite panels were approximately 1 mm thick and were cut into 4.5×4 inch panels. The measured resistance of the composite panel was in the range of $10^9$-$10^{11}$ ohm/sq. on side (a) and $10^0$-$10^3$ ohm/sq. on side (b). Three substrate preparations were evaluated: (A) was the composite panel, (B) was the composite panel with a spray applied waterborne conductive adhesion promoter, and (C) was the composite panel with a spray applied solventborne conductive adhesion promoter.

Substrates B and C were prepared by first cleaning the composite panel with SXA330, commercially available from PPG Industries, Inc. Then, the conductive adhesion promoter, MWPH3900 (substrate B) or MPP4100G (substrate C) waterborne or solventborne respectively (both commercially available from PPG Industries, Inc.), was spray applied to one side of the panel in 4 coats with a 3-5 minute ambient flash between coats with a DeVilbiss GTi HVLP spray gun with a 1.4 mm nozzle. The panel was then baked for 5 minutes at 60° C. The other side was then coated in the same manner such that both sides of the panel were coated.

AEROCRON, an electrophoretically depositable coating available from PPG Industries, Inc. was placed in a plastic container equipped with a magnetic stir bar and stainless steel heating/cooling coil which also served as the cathode for the electrodeposition process. The coating bath was maintained at 75° F. (24° C.). The substrates, as described above, were immersed 4 inches into the paint bath where application voltage, amperage, and coat time were varied as summarized in Table 1 below. Following coat out the panels were spray rinsed with deionized water and allowed to dry for 10 minutes. The coated panels were then baked for 30 minutes in a forced air electric oven set to 200° F. (93° C.).

TABLE 1

Examples of electrophoretically deposited coating to composite substrate

| Substrate | Amperage limit (amps) | Voltage (V) | Coat time (sec) | Approx. coating coverage side (a) | Approx. coating coverage side (b) |
|---|---|---|---|---|---|
| A | 0.4 | 150 | 90 | None | 85% |
| A | 0.4 | 150 | 300 | None | 85% |
| A | 0.6 | 250 | 90 | 5% | 90% |
| B | 0.5 | 150 | 90 | 5% | 100% |
| B | 0.5 | 170 | 90 | 10% | 90% |
| C | 0.5 | 150 | 90 | 100% | 100% |
| C | 0.5 | 170 | 90 | 100% | 100% |

As can be seen in Table 1, all variations had complete or nearly complete coating of at least one side of the substrate of interest. Also, the electrophoretic coating application was enhanced by increasing amperage and voltage and to a greater extent by the presence of an additional conductive coating layer.

What is claimed is:

1. A coated substrate comprising:
   A) an electroconductive, resinous composite substrate comprising a resinous matrix reinforced with fibers, and
   B) a cured coating layer electrophoretically deposited on at least a portion of a surface of the substrate, wherein the cured coating layer is deposited from a curable, electrodepositable coating composition comprising:
      (1) a resin component containing an active hydrogen-containing, cationic or anionic resin comprising an acrylic, polyester, polyurethane and/or polyepoxide polymer; and
      (2) a curing agent.

2. The coated substrate of claim 1, wherein the resinous matrix comprises polystyrene, polyaniline, polypyrrole, polyepoxide, poly(methyl methacrylate), polyurethane, and/or polycarbonate.

3. The coated substrate of claim 1, wherein the fibers are electroconductive.

4. The coated substrate of claim 1, wherein the fibers comprise stainless steel fibers, copper fibers, nickel fibers, silver fibers, aluminum fibers, metal plated glass fibers, and/or carbon fibers.

5. The coated substrate of claim 1, wherein the electroconductive composite substrate further comprises electroconductive particulate filler distributed throughout the resinous matrix and comprising one or more of zinc, ferrophosphorus, tungsten, carbon, nickel, aluminum, copper, iron, steel, molybdenum disulphide, iron oxide, antimony doped titanium dioxide, nickel-doped titanium dioxide, graphite, silver, and/or aluminum particles.

6. The coated substrate of claim 1, wherein a primer or adhesion promoter coating layer is deposited on the surface of the substrate prior to application of the coating layer B).

7. The coated substrate of claim 6, wherein an adhesion promoter coating layer is deposited on the surface of the substrate from a composition comprising:
   (a) a halogenated polyolefin;
   (b) a film-forming polymer different from the polyolefin (a); and
   (c) an electroconductive pigment.

* * * * *